United States Patent
Luo

(12) 
(10) Patent No.: US 6,423,395 B1
(45) Date of Patent: Jul. 23, 2002

(54) STRIP BETWEEN A RIM AND AN INNER TUBE OF A TIRE

(76) Inventor: Tsai Jen Luo, No. 215, Meei-Kong Rd., Ta-Suen, Chang-Hwa (TW)

(*) Notice: Subject to any disclaimer, the term of this patent is extended or adjusted under 35 U.S.C. 154(b) by 0 days.

(21) Appl. No.: 09/427,723

(22) Filed: Oct. 27, 1999

(51) Int. Cl.⁷ ................................................ B32B 3/10

(52) U.S. Cl. ..................... 428/138; 428/131; 428/137; 152/365

(58) Field of Search ................................. 428/131, 137, 428/138; 152/365

(56) References Cited

FOREIGN PATENT DOCUMENTS

EP          561762 A1  *  2/1993  ........... B60B/21/12

* cited by examiner

Primary Examiner—Blaine Copenheaver
Assistant Examiner—Christopher Paulraj
(74) Attorney, Agent, or Firm—Rosenberg, Klein & Lee

(57) ABSTRACT

A strip located between a rim and an inner tube of a tire includes a non-flexibility fabric portion and a flexible section which is connected between two ends of the fabric portion so as to become a loop to wrap around the rim. The fabric portion is much longer than the flexible section and an aperture for the inflation valve is defined through the fabric portion. The fabric portion is durable and having a better structural strength so as to provide a better protection for the inner tube.

5 Claims, 4 Drawing Sheets

STRIP BETWEEN A RIM AND AN INNER TUBE OF A TIRE

FIELD OF THE INVENTION

The present invention relates to a strip located between an inner tube and a rim of a tire. The loop-shaped strip includes a non-flexibility fabric portion with its two ends respectively connected with a short section of flexible belt. The fabric portion includes an aperture for the inflation valve extending therethrough. The strip provides a durable feature so as to effectively separate the inner tube from the inside of the rim and the spokes.

BACKGROUND OF THE INVENTION

A conventional composition of a bicycle wheel is shown in FIG. 4 and generally includes a rim 10 which is made of metal material, a strip 14 located on the inside bottom 103 of the rim 10, a tire 13 an inner tube 12 which is located between the strip 14 and the tire 13. The rim 10 has two sidewalls and a plurality of holes 101 are defined through the inside bottom 103 so as to allow the head of spokes 11 to be engaged therewith. An aperture 102 is further defined through the inside bottom 13 to let an inflation valve 120 be engaged with the aperture 102, wherein the inflation valve 120 is connected to the inner tube 12. The strip 14 is provided with a hole 140 so that the inflation valve 120 extends through the hole 140 in the strip 14 and the aperture 102 in the rim 10. The position and the purpose that the strip 14 is located are to prevent the inner tube 12 from being worn by the heads of the spokes 11. However, because the width of the strip 14 is limited so that there is only a small area between two sides of the strip 14 and the periphery defining the hole 140 in the strip 14, the small areas tend to be torn. Once either one of the small areas is torn, the other small area is torn within a short period of time and the inner tube 12 is exposed to the spokes 11. This will damage the inner tube 12 quickly. Furthermore, the rubber made strip 14 become hardened and is easily cracked when a high temperature is occurred.

The present invention intends to provide a strip which is composed a long section of non-flexibility fabric and only a short section of flexible belt is connected between two ends of the fabric so as to be a loop. The inner tube is well protected by the strip and the strip is strong enough to prevent the inner tube from being torn off.

SUMMARY OF THE INVENTION

In accordance with one aspect of the present invention, there is provided a strip located between a rim and an inner tube of a tire. The strip includes a non-flexibility fabric portion and a flexible section which is connected between two ends of the fabric portion.

The object of the strip in accordance with the present invention is to provide a better protection for the inner tube of a tire and the structural strength of the non-flexibility fabric portion prevents the damage around the aperture through which the inflation valve extends.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
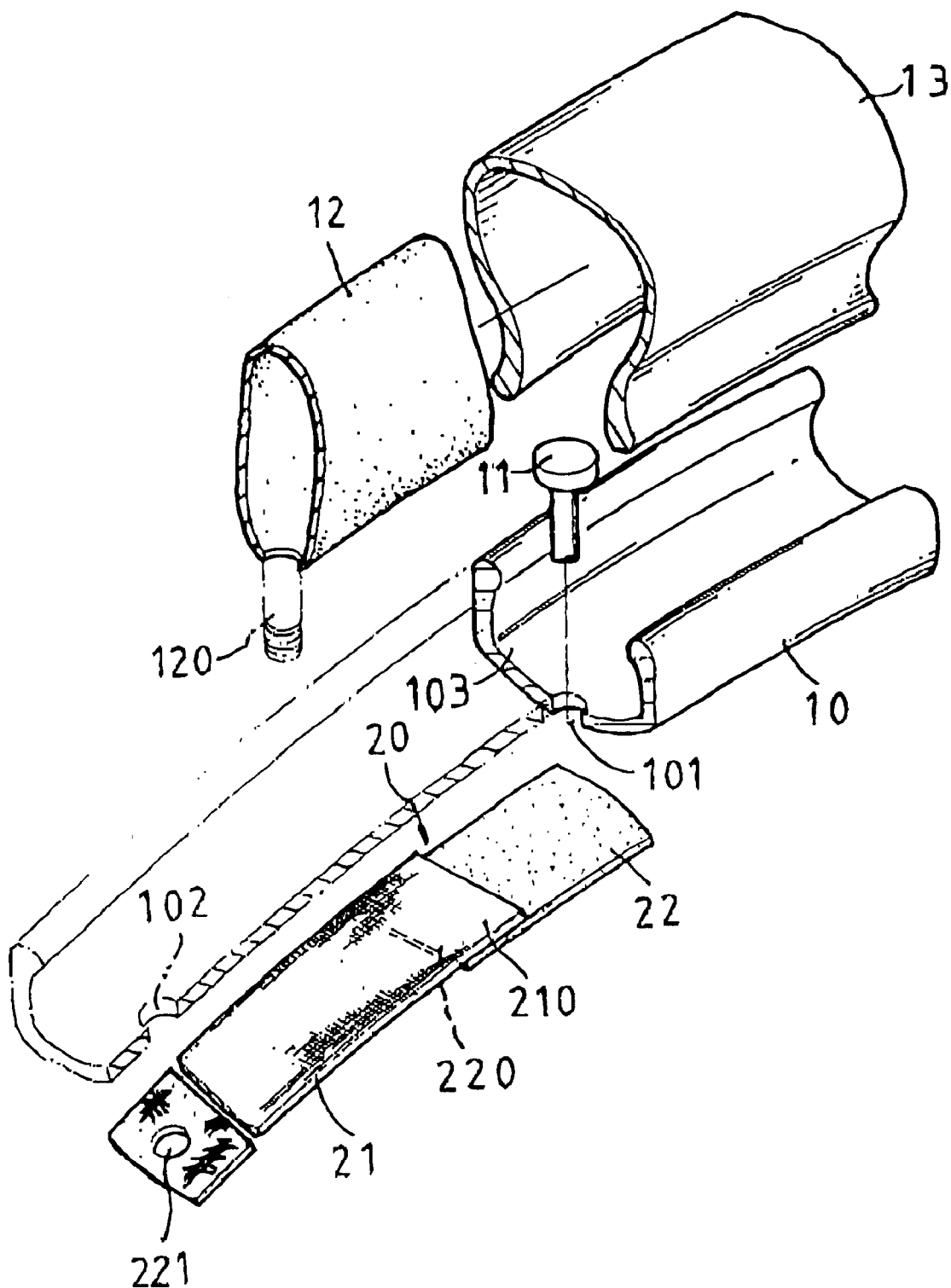
FIG. 1 is an exploded view to show a tire, an inner tube, a rim and a strip in accordance with the present invention.
Figure 2:
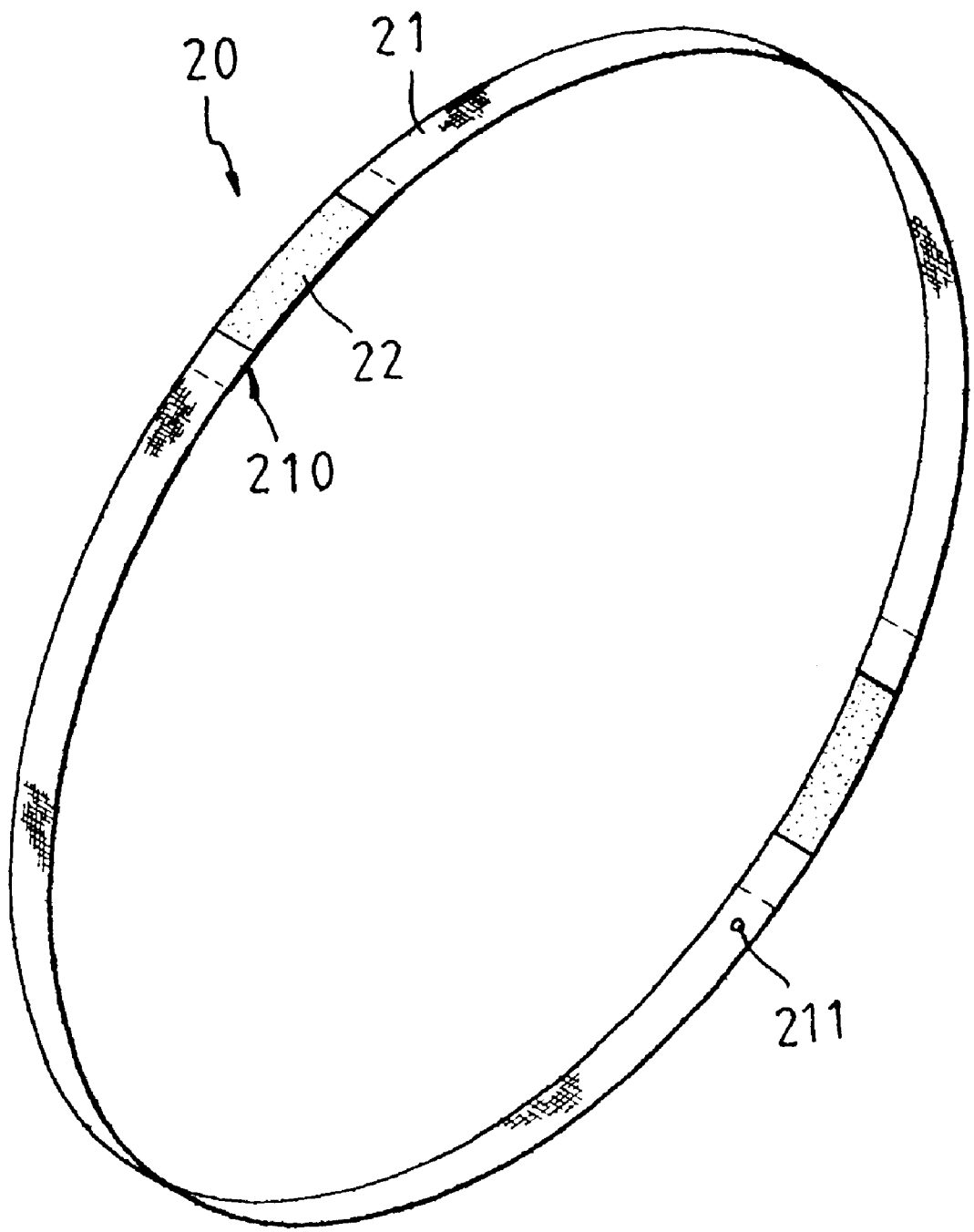
FIG. 2 is a perspective view to show the loop-shaped strip composed of the fabric portion and the flexible section of the present invention.

Referring to FIGS. 1 to 4, the strip 20 in accordance with the present invention is located between a rim 10 and an inner tube 12 of a tire 13. The inner tube 12 has an inflation valve 120 and is located between the rim 10 and the tire 13. The tire 13 has two annular lips so as to engage with the sidewalls of the rim 10 as known to persons in the art. The rim 10 has a plurality of holes 101 and a valve hole 102 respectively defined through the inside bottom 103 thereof. Each hole 101 is engaged with a head of a spoke 11.

The strip 20 includes a non-flexibility fabric portion 21 and a flexible section 22 which has two distal ends 220 connected between tow ends 210 of the fabric portion 21 by overlapping the two ends 210 of the fabric portion 21 on the two distal ends 220 of the flexible section 22. The fabric portion 21 is much longer than the flexible section 22 and an aperture 221 is defined through the fabric portion 21 so that the inflation valve 120 extends through the aperture 221 and the valve hole 102 in the rim 10.

Figure 3:
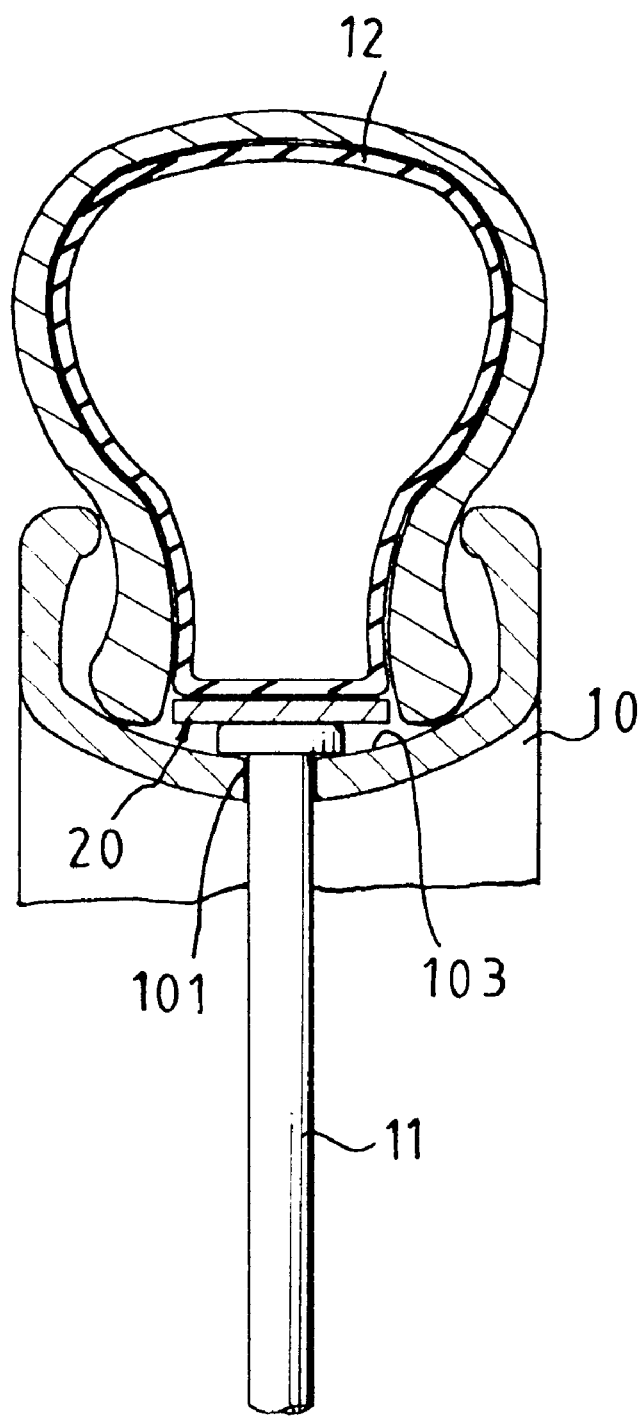
FIG. 3 is a cross-sectional view to show the strip of the present invention located between the inner tube and the rim.
Figure 4:
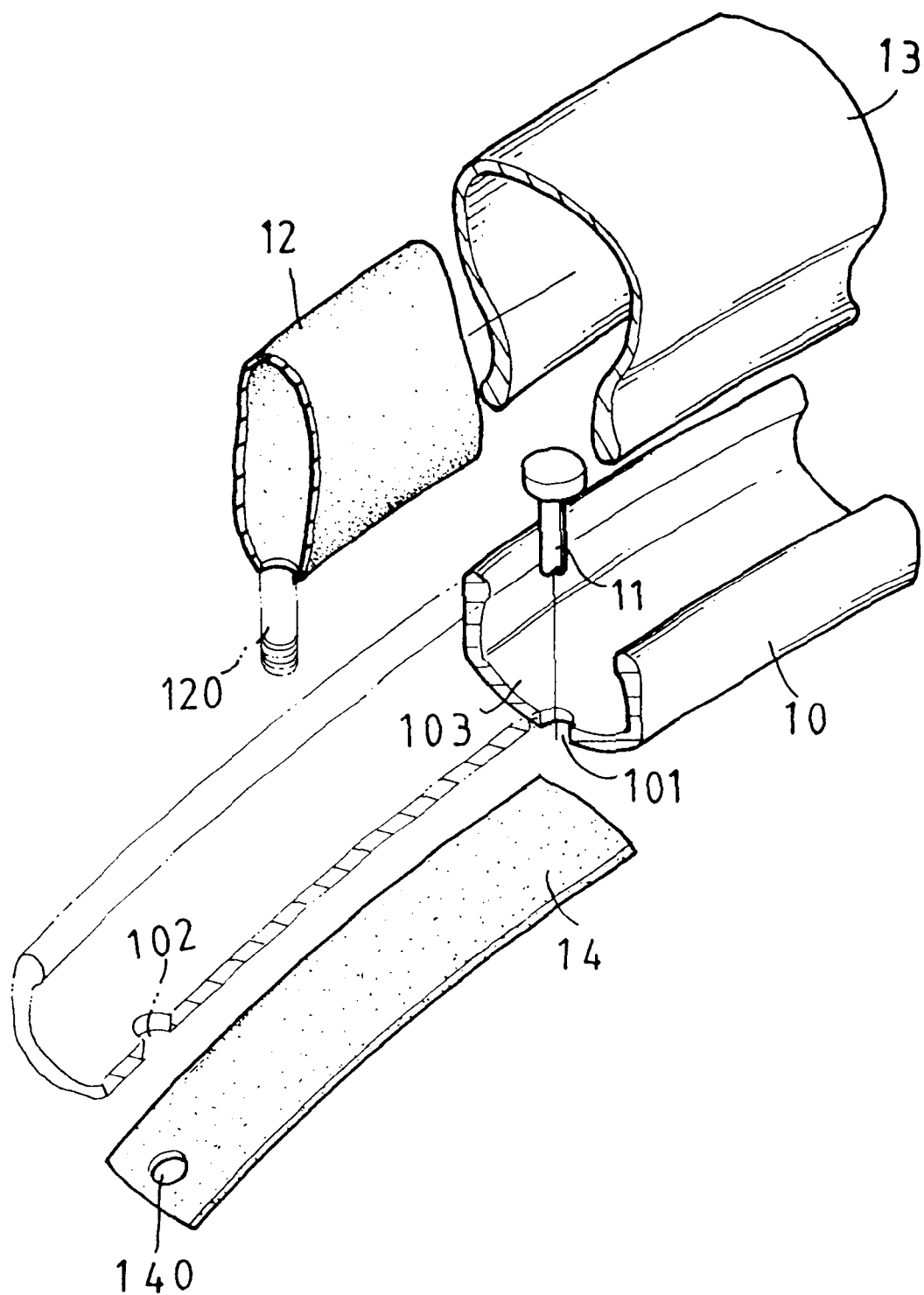
FIG. 4 is an exploded view to show a tire, an inner tube, a rim and a conventional strip.

As shown in FIG. 3, the durable fabric portion 21 is located between the head of the spokes 11 and the inner tube 12 so that the inner tube 12 is well protected and will not be scraped by the head of the spokes 11. Besides, the fabric portion 21 has better structural strength so that the aperture 221 will not weaken the structural strength of the area around the aperture 221.

The strip 20 in accordance with the present invention improves all the shortcomings found in the conventional strip and elongates the life of use of the inner tube 12.

While we have shown and described various embodiments in accordance with the present invention, it should be clear to those skilled in the art that further embodiments may be made without departing from the scope and spirit of the present invention.

What is claimed is:

1. A strip apparatus for protectively extending between a tire inner tube and rim comprising:

at least one elongate fabric portion having opposed first and second ends, said fabric portion being formed of a substantially inelastic fabric material; and, at least one flexible section formed of an elastic material coupled to said fabric portion, said flexible section having at least one end joined in overlapped manner to one of said first and second ends of said fabric portion.

2. The strip apparatus as recited in claim 1 wherein said flexible section extends between said first and second ends of said fabric portion, said flexible section having first and second ends thereof respectively joined in overlapped manner to said first and second ends of said fabric portion.

3. The strip apparatus as recited in claim 1 wherein said fabric portion is greater in length than said flexible section.

4. The strip apparatus as recited in claim 1 wherein said fabric portion includes an aperture formed therethrough.

5. The strip apparatus as recited in claim 1 comprising a pair of said fabric portions and a pair of said flexible sections extending therebetween.

* * * * *